United States Patent [19]
Fleischer, deceased

[11] 3,811,215
[45] May 21, 1974

[54] LOCKING DEVICE FOR FISHING RODS

[76] Inventor: Oscar Fleischer, deceased, late of Century Towers, 100 Kings Point Dr., North Miami Beach, Fla. 33160
Helen Krohn Fleischer, executrix

[22] Filed: Sept. 5, 1972

[21] Appl. No.: 286,598

[52] U.S. Cl.................. 43/18 R, 403/189, 403/263
[51] Int. Cl............................................ A01k 87/02
[58] Field of Search ........ 43/18 R, 18 GF; 287/107, 287/116, 52.06

[56] References Cited
UNITED STATES PATENTS

| | | | |
|---|---|---|---|
| 3,060,617 | 10/1962 | Hamp................................. | 43/18 R |
| 3,445,952 | 5/1969 | Ferman............................. | 43/18 GF |
| 339,368 | 4/1886 | Black et al...................... | 287/116 X |
| 3,251,616 | 5/1966 | Garstang et al.................. | 287/52.06 |
| 1,450,700 | 4/1923 | Mull............................... | 43/18 R X |

*Primary Examiner*—Robert Peshock
*Assistant Examiner*—Daniel J. Leach
*Attorney, Agent, or Firm*—Salvatore G. Militana

[57] ABSTRACT

A device for locking a fishing rod to the handle tubular member having telescoping members whereby the end of the rod is received by a socket formed in the tubular member. The latter which is threaded receives a lock nut slidably positioned on the rod, the lock nut being provided with an annular shoulder for engaging a compression ring. The ring is split having an inclined front edge which engages an oppositely inclined edge of the tubular member so that as the lock nut is threaded on the tubular member, the compression ring is compressed to engage the rod tightly as the ring is forced into tight engagement with the end of the tubular member whereby the handle member and rod are fastened securely together.

1 Claim, 6 Drawing Figures

LOCKING DEVICE FOR FISHING RODS

BACKGROUND OF THE INVENTION

1. Field of the Invention

This invention relates to fishing rods and is more particularly directed to a locking device for securing a rod to the handle of the fishing rod at the position of the fishing reel.

2. Description of the Prior Art

At the present time, the most prevalent manner of securing a rod to the handle of a fishing rod is by virtue of the close tolerances of the end of the rod as it fits into a socket formed in the tubular member of the handle. Due to the fact that the two members are not in fact secured against turning with relation to each other, there is the constant danger that the reel and line guides move out of alignment with each other. On the other hand, if the rod fits tightly in the socket of the handle, as it should, then when moisture gets into the socket a vacuum effect is created as one tries to pull the rod out of the socket requiring a tremendous amount of force to separate the two parts.

The conventional locking device is dependent upon the close tolerances and snug fit of the end of the fishing rod and the socket of the handle, thereby creating friction from metal to metal contact. In addition salt and other foreign substances of the sea water will collect in the space between the end of the rod and the socket of the handle, thereby creating greater friction therebetween from the tendency to erode, rust, or corrode. This results in the requirement of a great deal of force to assemble or dismantle the rod from the handle. In fact, corrosion at times forms therein to such an extent as to inadvertently lock the two members together, thereby defeating the purpose of the original intent.

SUMMARY OF THE INVENTION

The present invention contemplates avoiding the objections to the present manner of securing the rod to a handle of a fishing rod by providing a lock nut in combination with a compression ring whereby the compression ring is readily forced into tight frictional engagement with the rod and the tubular member forming the handle and just as readily released to permit the separation of the two parts.

Another object of the present invention is to provide a means for locking a rod to the handle section of a fishing rod without requiring close tolerances in size so that the two parts fit together easily and securely without the possibility of their becoming misaligned.

A further object of the present invention is to provide a locking means for securing a rod to the handle section of a fishing rod which permits wide clearance therebetween, thereby assuring an easy assembly and dismantling of the fishing rod.

A still further object of the present invention is to provide a locking means for securing a rod to the handle of a fishing rod, which means is simple in construction, low in cost and readily adapted to the fishing rods as presently constructed.

A still another object of the present invention is to provide a means for aligning and securing in said alignment position of a rod and a handle of a fishing rod whereby the reel and line guides cannot become misaligned.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claim.

BRIEF DESCRIPTION OF THE DRAWINGS IN THE DRAWINGS

FIG. 5 is an enlarged perspective view thereof.

FIG. 6 is an enlarged perspective view of the compression ring.

DESCRIPTION OF THE PREFERRED EMBODIMENT

Figure 1:
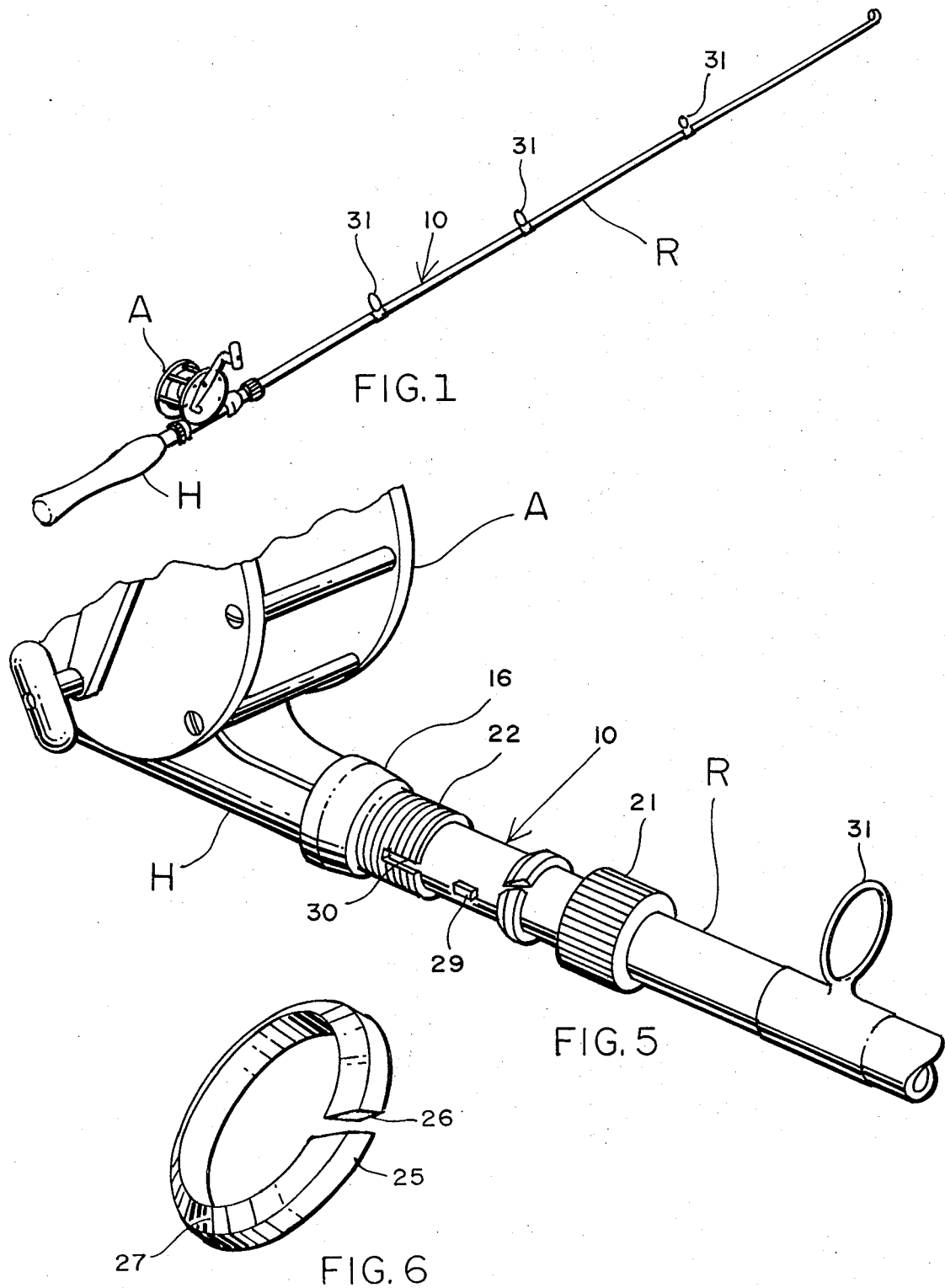
FIG. 1 is a perspective view of a fishing rod on which my new invention is embodied.
Figure 2:
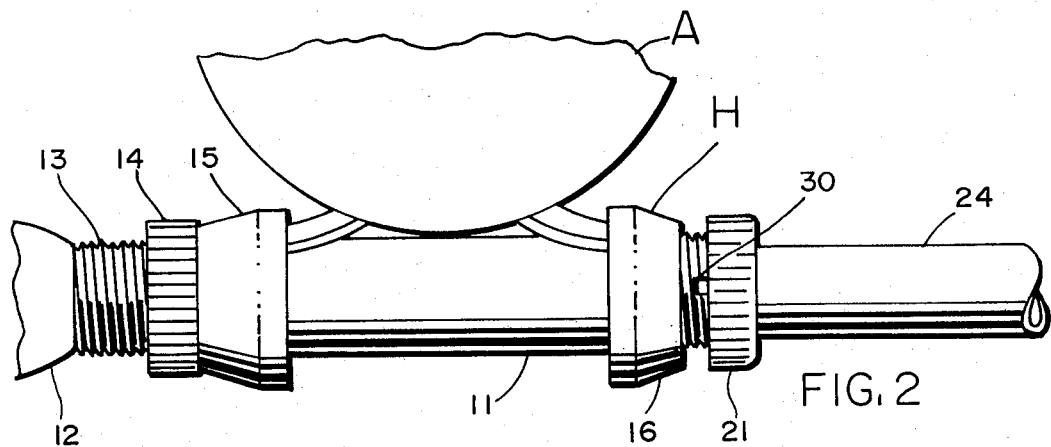
FIG. 2 is a fragmentary side elevational view thereof.
Figure 3:
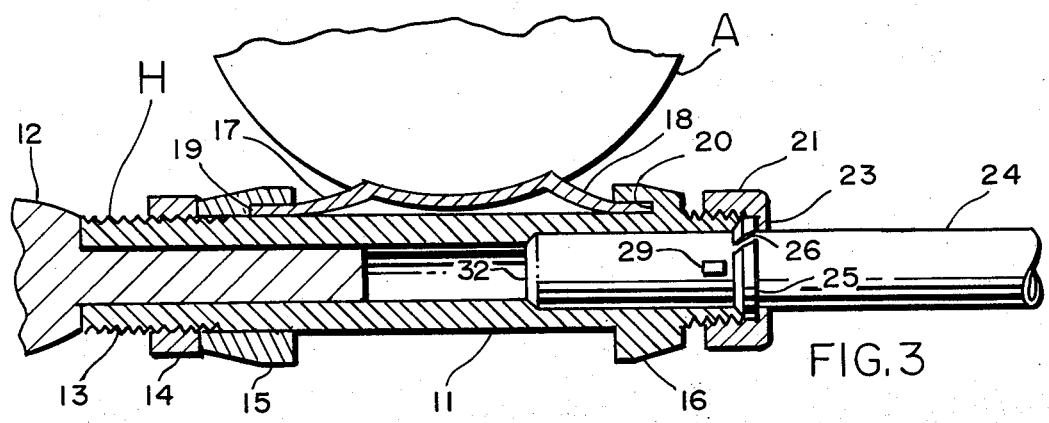
FIG. 3 is a cross sectional view illustration of the manner of locking the rod to the handle of the fishing rod.

Referring to the drawings wherein like numerals are used to designate similar parts throughout the several views, the numeral 10 refers to a conventional fishing rod which consists generally of a handle section H on which a rod member R is telescopically secured as is explained in detail hereinafter.

The handle section H consists of a tubular portion 11 having a handle portion 12 fabricated of cork or similar material that facilitates the manual gripping of the fishing rod 10. Adjacent thereto is a threaded portion 13 on which a collar 14 is threadedly mounted thereon. The collar 14 engages a rear tang engaging ferrule member 15 that is slidably positioned on the tubular member 11. At the other end of the tubular member 11 there is mounted thereon a forward tang engaging ferrule member 16 rigidily attached thereto. The tang engaging ferrule members 15 and 16 are provided with sockets 19 and 20, respectively, to receive rear and forward tangs 17 and 18, respectively, of a conventional reel assembly A. The rear tang engaging ferrule member 15 is forcibly slid in the forward direction on the tubular member 11 by threading the collar 14 to compel the rear tang 17 to be received in the socket 19, and the reel A be secured to the handle section H.

At the extreme forward end portion of the handle section H are threads 22 with which an annular mounting and locking collar 21 is threadedly engaged. The locking collar 21 that is provided with an annular collar 23 is telescopically mounted on the rod 24 of the fishing rod assembly R. In addition to the locking collar 21 there is a compression ring slidably mounted on the rod 24. The compression ring 25 is split as at 26 and is provided with a bevelled or inclined front edge portion 27 which is adapted to engage on inclined edge portion 28 of the tubular member 11. Mounted on the outer surface of the rod 24 is a tit or protuberance 29 that is received by an open ended slot 30 formed at the forward edge thereof. The purpose of the tit 29 and slot 30 is to align the reel A with the fishing line guide or eyelets 31.

The end portion 32 of the rod 24 is received by a socket 33 formed at the forward end of the tubular member 11. The socket 33 and the tubular portion 34 are joined by an inclined wall portion 35 that seats the end of the rod 24 as at 36. As will be explained in detail hereinafter, the rod 24 does not have to fit snugly in the socket 33 to be firmly secured to the tubular member 11.

In the normal manner of assemblying the reel A and handle section H, the forward reel tang 18 is slid into the socket 20 of the forward ferrule 16 and the rear ferrule 15 is slid forwardly to compel the rear tang 17 to slide into the socket 19. Then the collar 14 is threaded forwardly to engage the ferrule 15 and retain it in position to maintain the tang 17 in the socket 19.

Figure 4:
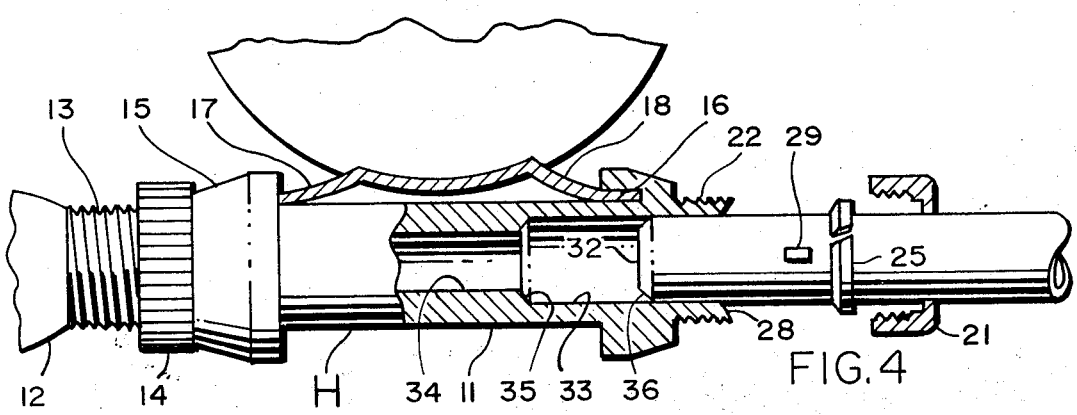
FIG. 4 is a perspective view showing the various parts prior to locking the rod to the handle.

Now the rod 24 with the compression ring 25 and lock collar 21 positioned thereon as shown by FIG. 4 is inserted into the socket 33 with the base 36 of the rod 24 engaging the base wall 35 of te socket 33. At the same time the rod 24 is rotated to a position so as to permit the tit 29 to be received by the slot 30 whereby the line guides 31 become aligned with the reel A. The compression ring 25 is then slid on the rod 24 until it engages the edge 28 of the tubular member 11. The lock collar 21 is then threaded onto the threads 22 of the tubular member 11. The annular shoulder 23 then engages the compression ring 25 causing the bevelled front edge 27 of the ring 25 to engage the edge 28 of the tubular member 11 to cause the ring 25 to become compressed about the rod 24 as the gap 26 becomes foreshortened. At the same time that the compression ring 25 becomes tightened on the rod 24, it wedges tightly against the edge 28 of the tubular member 11 to lock the rod 24 and tubular member 11 securely together.

From the above description taken in connection with the figures of the accompanying drawing, the invention permits the rod to be readily secured together without requiring close tolerances in the sizes of the rod end portion 32 and the socket 33. By seating the bevelled edge of the rod end portion 32 against the inclined wall 35 of the socket 33 and threading the lock nut 21 on the threads 22 to force the compression ring 25 to become tightened about the rod 24 and bear against the inclined edge 28 of the tubular member 11, the rod R becomes securely fastened to the handle section H. The insertion of the tit 29 in the slot 30 insures against any possibility of the rod 24 rotating about its axis and prevents causing the reel A and line guides 31 from becoming misaligned. Likewise, the rod R is readily removed from the handle section H by merely unthreading the lock nut 21 from the handle section 11. The tit 29 also serves to prevent the compression ring 25 and lock nut 21 from sliding off the rod 24 when the fishing rod 10 has been dismantled for storing away. If desired, alternate means may be used to substitute for the tit 29 and slot 30 such as markings, indicia, etc. made as indicators to align the line guides 31 and the reel A.

What I claim as new and desire to secure by Letters Patent of the United States is:

1. In a fishing rod having a tubular handle section and a rod, said rod being telescopically received in a socket formed in the forward end of said tubular handle section, threaded means formed on said forward end of said tubular handle section, a lock nut mounted on said rod threadedly engaging said threaded means, a split compression ring slidably mounted on said rod and positioned between said forward end of said tubular handle section and said lock nut, said lock nut having shoulder means engaging said split compression ring and said forward end of said tubular member and said split compression ring having inclined edge portions engaging each other whereby upon the threading of said lock nut on said threaded means said shoulder means forces said split compression ring to engage said forward end of said tubular member and said split compression ring becomes compressed about said rod to lock said rod and said handle section together.

* * * * *